Aug. 6, 1968  C. C. LEGAL, JR., ET AL  3,396,004
CONTINUOUS METHOD OF PRODUCING AMMONIUM PHOSPHATE FERTILIZER
Filed Dec. 29, 1966
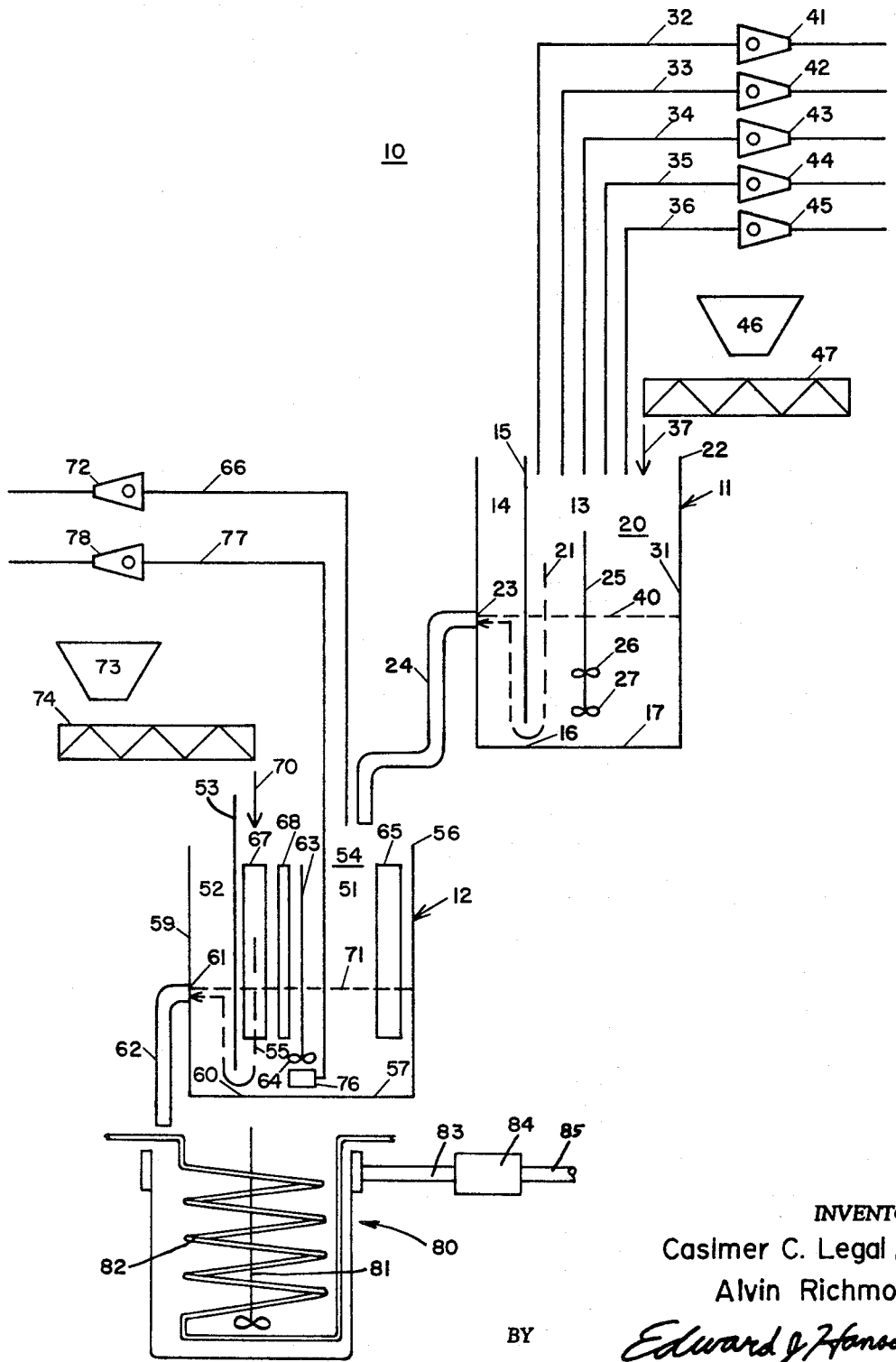
INVENTORS
Casimer C. Legal, Jr.
Alvin Richmond
BY  *Edward J. Hanson Jr.*
ATTORNEY 3,396,004
CONTINUOUS METHOD OF PRODUCING AMMONIUM PHOSPHATE FERTILIZER
Casimer C. Legal, Jr., Elkridge, and Alvin Richmond, Baltimore, Md., assignors to W. R. Grace & Co., New York, N.Y., a corporation of Connecticut
Filed Dec. 29, 1966, Ser. No. 605,929
5 Claims. (Cl. 71—39)

ABSTRACT OF THE DISCLOSURE

A continuous method and apparatus for producing fertilizers by reacting phosphate rock with an acid and neutralizing the acidulate. Phosphate rock and an acid are continuously charged to a digestion reaction zone to form an acidulated mass. The acidulate is continuously removed from the digestion zone through a quiet section and then transferred to a neutralization zone. In the neutralization zone, the mass is neutralized with ammonia and continuously removed from the neutralization zone through a quiet section of said neutralization zone.

---

This invention relates to the manufacture of slurry fertilizers and is particularly applicable to a continuous process for producing slurry fertilizers by reacting phosphate rock with acid and substantially neutralizing the acidulate.

When phosphate rock is acidulated with an acid the citrate insoluble phosphates in the rock are generally converted to about 95% or higher citrate soluble phosphates. If the acidulate is then subjected to ammoniation the phosphates may revert back to something on the order of 50% citrate insoluble phosphates. During ammoniation the mass may also "set up" rendering further ammoniation impossible.

It is an object of this invention to provide a continuous process for producing an unrefined acidulated phosphate rock fertilizer that has been neutralized with ammonia and that has a high citrate soluble $P_2O_5$ content. Another object of this invention is to provide a continuous process for acidulating phosphate rock with an acid and ammoniating the acidulate to obtain a substantially neutral fertilizer product having a high citrate soluble phosphate content. A still further object of this invention is to provide a simple and inexpensive method of acidulating phosphate rock and subsequently neutralizing the acidulate, yielding a slurry fertilizer product having a relatively high citrate soluble phosphate content. It is still another object of this invention to provide a new and improved combination of apparatus for continuously acidulating phosphate rock and subsequently neutralizing the acidulate.

Summarily, in carrying out one aspect of the present invention, in one preferred form thereof, a continuous process is provided wherein an acid, is introduced continuously into a digestion-reaction zone simultaneously with the continuous addition of phosphate rock into the reaction zone. The water content of the mass is constantly maintained at a level that will keep the mass continuously fluid. The acid and phosphate rock are thoroughly mixed in the digestion-reaction zone to form an acidulation mass and contact the acid thoroughly with the surfaces of the phosphate rock.

The mass is continuously transferred from the first reaction zone to a second neutralization-reaction zone where ammonia is introduced into the mass while the mass is continuously and thoroughly mixed to maintain a substantially uniform pH above about 4.5 and below about 6.5. A period of time is provided between the time in which the acid and phosphate rock are mixed together and the time that effective neutralization of the acidulate occurs to assure substantially complete digestion of the phosphate rock by the acid.

In preferred embodiments the neutralized mass is cooled to below 130°, preferably 100° F. within 1 hour more preferably 30 minutes after the mass was introduced into the second reaction zone and the mass is of sufficient volume in ratio to the rates at which the materials are being charged thereto to permit the rates at which the materials are being added to be adjusted with only visual monitoring of reaction zone 1 and of reaction zone 2 when any undesirable thickening or thinning of the mass occurs. A pH reading is taken of the neutralized mass as it is withdrawn from the neutralization reaction zone and the ammoniation rate is adjusted to compensate for any fluctuations. A reading does not need to be taken in the neutralization reaction zone because the mass is of sufficient volume to render the pH fluctuations sufficiently gradual for external reading of the outflow.

In another of its aspects, in a preferred form, the invention is directed to a new combination of apparatus that has a first reaction chamber with a circuitous flow path therethrough providing a predetermined dwell time in a compact dimension at a given flow rate. The inlets for charging the first reaction chamber are spaced above the normal level of the mass when the apparatus is on stream and the first section of the chamber extends downwardly so heavy particles charged into the chamber will fall through the mass where they can be acted upon. A second section of the first reaction chamber extends upwardly so that heavy particles will not be carried by the moving mass through this section until they have been digested. An agitator is mounted in the first section of the first reaction zone to thoroughly contact the reactive portions of the mass in the first chamber with one another. The second section of the first reaction chamber is free from agitation. This reduces agitation power requirements and provides a non-turbulent withdrawal of a substantially homogeneous mass from the reaction zone.

A second reaction chamber of the apparatus is also built in a circuitous path to provide a predetermined dwell time in a compact dimension at a given flow rate. The first section of the second reaction chamber has a flow connection at an upper region to an upper region of the second section of the first reaction chamber. The first section of the second reaction chamber extends downwardly from this flow connection and an agitator is mounted in this section to thoroughly disperse the reaction portions of the mass and contact them with one another. A sparger opens under the agitator blade of the second reaction chamber at a substantial depth below the normal level of the mass when the apparatus is on stream. Therefore, when anhydrous ammonia is introduced into the mass through the sparger and vaporizes, it will be dispersed by the agitator as it rises in the mass and the distance it must travel upwardly through the downwardly moving mass will provide a prolonged ammonia retention time resulting in good absorption of the ammonia. The other inlets for charging the second reaction chamber are spaced above the normal level of the mass. A second section of the second reaction chamber is spaced horizontally from the first section of the second reaction chamber and extends upwardly, so that only a substantially homogeneous neutralized mass passes through it. This second section is free of agitation, reducing agitation power requirements and providing for a non-turbulent withdrawal of a substantially homogeneous mass from the reaction zone.

A cooling means is positioned downstream from the second reaction chamber. This cooling means has a capacity to cool the mass withdrawn from the second reaction chamber from 235° F. to below 130° F., preferably 100° F. within less than 20 minutes preferably 10 minutes or less. The cooling means has a flow connection to an upper region of the second section of the second reaction chamber. A pH meter is flow connected to the outlet of the cooling means.

Further aspects of the present invention will become apparent hereinafter and the specification concludes with claims particularly pointing out and distinctly claiming the subject matter which we regard as our invention. The invention, however, as to organization and method of operation, together with other objects and advantages thereof, may best be understood by reference to the following description when taken in conjunction with the accompanying drawing.

The drawing is a diagrammatic representation of the apparatus of this invention.

Referring to the drawing, the apparatus 10 can be seen to have two open reactor tanks 11 and 12 arranged in series. The tank 11 is divided into a first section 13 and a second section 14 by a dividing wall 15. The reactor tank 11, therefore, has a circuitous chamber 20 and a circuitous flow path 21 that begins at the top 22 of the first section 13 and extends to the bottom 17, through the opening or passageway 16 and above the opening 23 into the outlet conduit 24. The reactor 11 is equipped with an agitator 25 which has two propellers 26 and 27. Several baffles may be attached to the side 31 of the reactor tank 11.

Liquid dispensing conduits 32, 33, 34, 35 and 36 and solids dispensing conduit 37 open above the normal, fluid level 40 of the first section 13 of tank 11 when the apparatus 10 is on stream. This provides an air space between the conduits and the normal fluid height 40 (shown in broken lines) and prevents the conduits from becoming contaminated by the fluid in the tank 11 with the likelihood of the conduits being fouled or damaged. Conduit 32 is connected through metering means 41 to a sulfuric acid storage tank (not shown). Conduit 33 is connected through metering means 42 to a nitric acid storage tank (not shown) and conduit 34 is connected through metering means 43 to a phosphoric acid storage tank (not shown).

Water is supplied through conduit 35 which is connected through metering means 44 to a water source (not shown) and defoamer is supplied through conduit 36 which is connected through metering means 45 to a storage source (not shown). The phosphate rock is moved from a storage source by the conveying member 46 to the feeding unit 47. The feeding unit 47 feeds the rock through the conduit 37 into the tank 11.

The outlet 23 opens through the side wall 31 of reactor 11 in the second section 14. The dwelling time for the fluid mass in chamber 20 is determined by the distance the outlet conduit 23 is positioned above the bottom 17 of the tank 11 and the rate at which the ingredients are added.

The oulet conduit 24 discharges into the second reactor tank 12. The second tank 12 is divided into a first section 51 and a second section 52 by the dividing wall 53. The reaction tank 12, therefore, has a circuitous chamber 54 and a circuitous flow path 55 that begins at the top 56 of the first section 51 and extends to the bottom 57, through the opening 60 and above the opening 61 in the side wall 59 of the second section 52. The opening 61 feeds into outlet conduit 62. The reactor 12 is equipped with an agitator 63 which has a propeller 64. Baffles 65, 67 and 68 are attached to the side 59 of the reactor tank 12. A fourth baffle is also attached to the side 59, but it is not shown. The adjacent baffles are at right angles to one another.

Liquid dispensing conduit 66, feed conduit 24, and solids dispensing conduit 70 open above the normal, fluid level 71 of the first section 51 of the tank 12 when the apparatus 10 is on stream. This provides an air space between the conduits 66, 70 and 24 and the normal fluid height 71 (shown in broken lines) and prevents the conduits from becoming contaminated by the fluid in the reactor tank 12 with the likelihood of the conduits being fouled or damaged.

Spout 66 is connected through metering means 72 to a water source (not shown). The muriate of potash is moved from a storage source by the conveying member 73 to the feeding unit 74. The feeding unit 74 feeds the muriate of potash through the conduit 70 into the tank 12. Anhydrous ammonia is sparged into the fluid mass in reactor 12 through sparger 76 that is fed through a sparger conduit 77 which is connected through metering means 78 to an anhydrous ammonia storage source (not shown). The outlet 61 opens through the side wall 59 of reactor tank 12 in the second section 52. The dwell time for the fluid mass in the second circuitous chamber 54 is determined by the distance the outlet opening 61 is positioned above the bottom 57 of the tank 12.

The outlet conduit 62 feeds into a cooler crystallizer such as the chamber 80. The cooler-crystallizer 80 has an agitator 81 and a cold water coil 82 connected to a cool water source (not shown). The cooler-crystallizer 80 discharges into a conduit 83 which feeds through a pH meter 84 and into a discharge conduit 85 which may feed to storage facilities, transportation equipment or other processing equipment as desired.

In employing the above described arrangement the following specific parts have been successfully used in a bench scale model. The reactor 11 was a 316 stainless steel cylinder 8¼ inches in diameter by 16⅜ inches high with an overflow outlet 4¾ inches from the bottom of the cylinder. The outlet was shielded by a halved 3¼ inch 316 stainless steel pipe which was welded to the reactor 2 inches from the bottom. This shield formed the quiet zone 14. The capacity of the reactor to the overflow outlet was 4300 cc. of water. The reactor was equipped with an agitator 25 that had two 2 inch stainless stell propeller blades set about 2 inches apart. The lower blade was positioned about 1 inch above the bottom of the reactor. the agitator was driven at about 500 r.p.m.

The reactor 12 was a 316 stainless steel cylinder, 6⅜ inches in diameter by 12 inches high. A halved 3¼ inch 316 stainless steel pipe is welded to the outside of the reactor with its axis running parallel to the axes of the stainless steel cylinder and having the same height. The bottom of this cylinder was closed with a stainless steel plate and a slot 2 inches high by 3 inches wide cut through the wall of the stainless steel cylinder adjacent its bottom to connect the inside stainless steel cylinder with the chamber formed between the halved pipe and the cylinder. The overflow outlet was 4¾₆ inches, above the bottom plate of the halved pipe. The bottom plate was on a level with the bottom of the steel cylinder. There were four baffles in the stainless steel cylinder 12 at right angles to one another and set out ¼ inch from the side wall and 2 inches from the bottom of the cylinder. The baffles were ½ inch wide, 9 inches high and ⅛ inch thick. The reactors capacity to the overflow was 2520 cc. of water. The agitator had a 3 inch turbine blade. The reactor 12 can, however, be made from mild steel because using the process of this invention the pH of the material in this reactor is sufficiently high, i.e., 4.5 or higher to be relatively non-corrosive to mild steel.

The cooler-crystallizer was a 2 liter breaker equipped with a 1 inch propeller blade agitator. The cooling coil was ⅜ inch stainless steel tubing with 5 turns around the inside wall of the breaker. The temperature of the water fed into the coil was about 76° F. fed at the rate of 18.20 grams of water per minute.

In practicing the process in a preferred form, at least one strong acid selected from the group consisting of nitric, sulfuric and phosphoric acid and mixtures thereof an phosphate rock are continuously charged into one end of an extended circuitous reaction zone while a defoamer-dispersant is continuously added at a rate that will control foaming and act as an effective dispersant in the end product.

When the process is on-stream the materials charged into the reaction zone are added to the top of a columnar fluid mass, that is stirred mildly at the top of the column and vigorously in a middle region and at the bottom of the column. The mixing is more vigorous in the middle region of the column and in the lower portion of the column to assure the thorough contacting of all of the phosphate rock surfaces by the acid and to break up any lumps of phosphate rock material that might have formed.

The ingredients are charged to the surface of the columnar mass at different points and thus mixed with the mass as they are mixed together. This procedure levels out the concentration of the ingredients. It has been observed that the best acidulation results have been obtained if the acid is at an intermediate concentration when it comes into contact with the phosphate rock.

It has been found that in practice an effective acid to rock, $H^+$ to $P_2O_5$ mole ration of 6/1 is necessary for the practically complete digestion of the phosphate rock. When nitric acid and sulfuric acid are used they are counted at their full acid values when calculating their acid value. However, phosphoric acid has been found to have only 1/3 of its normal acid value in the reaction system of this invention and this factor must be taken into consideration when phosphoric acid is used. While the phosphate rock need not be sized, it has been found that phosphate rock that passes 100% through 30 mesh and about 60–70% through 200 mesh, U.S. Standard screen will pass downwardly in the mass as a relatively homogeneous part of the mass. Larger particles of phosphate rock tend to fall through the mass rather than moving as a part of the mass. It has also been found that a small quantity of an anionic surface active defoaming agent is often helpful in eliminating any significant foam level during acidulation. The anionic surface active defoaming agent is also useful as a dispersant and of some aid to the fluidity of the end product. The sodium salt of sulfonated oleic acid is a superior defoaming and dispersing agent for use in this process in amounts of from 0.01 to 0.03% of the end product. Other anionic surface active defoaming and dispersing agents are commercially available that can be used satisfactorily to control foaming during the acidulation of phosphate rock.

The fluid mass of the ingredients charged to the first reaction column move downwardly due to the effects of gravity as new material is added to the upper surface of the column. The movement of the mass is through a mixing and reaction section with an area of mild stirring and an area of vigorous stirring and then laterally into an upwardly moving column. This column is moved upwardly by the push of the downwardly moving column. The upwardly moving or second columnar mass in the first reaction zone is a quite, unagitated portion of the mass as it moves through the quiet section of the first reaction zone. The mass moves through the first reaction zone until the materials have been retained in the first reaction zone for the desired residence or dwell time. The residence time corresponds to the length of time necessary for the substantially complete digestion of the phosphate rock under the conditions then prevailing in the process system. Normally an average dwell time of 30 minutes is required to achieve the substantially complete digestion of the phosphate rock when the mole ratio of H ions to $P_2O_5$ value from the rock is in excess of about 6/1. Preferably a 60 minute dwell time is used to assure relatively complete conversion of the phosphorus in the phosphate rock. After the mass has been retained in the first reaction zone for a sufficiently long time, the mass is introduced into a second reaction zone. The transfer of the mass from the first reaction zone to the second reaction zone is a continuous process.

When the reaction mass of substantially completely digested phosphate rock is charged into the second reaction zone most of its phosphate has been converted by acidulation from a form that is not plant available to a plant available form of phosphate. Of course, the phosphate rock acidulation continues while the mass is being transferred from the first reaction zone to the second reaction zone and until the mass is effectively neutralized to a point rendering the acid ineffective as a phosphate rock acidulant. This reaction mass is moved downwardly in columnar fashion in the second reaction zone through a mixing and reaction section. The downward movement is due to the force of gravity as new material is added to the upper surface of the column. The upper portion of the downwardly moving column is mildly stirred and the lower portion of the column is stirred more vigorously.

Anhydrous ammonia is sparged into the vigorously stirred region where it is quickly and thoroughly dispersed laterally outwardly through the downwardly moving mass by the vigorous stirring action. Generally, a substantial portion of the anhydrous ammonia vaporizes before it is absorbed into the mass. The ammonia vapor moves upwardly in the downwardly moving column of the fluid mass. The downwardly moving column retards the upward movement of the ammonia vapor. This increases the period of ammonia retention for a given columnar height and reduces the height necessary to achieve the substantially complete absorption of the ammonia into the mass. Vigorous stirring of fluids having ammonia vapor dispersed in them increases the accumulation of the vapor into large vapor pockets that tend to rise rapidly in the fluid and escape unabsorbed from the fluid mass. Therefore, it is quite advantageous to have only a mild stirring action in the area where the ammonia vapor is rising through the mass.

The ammonia contacts unsaturated parts of the mass as it rises moving through the mass. This contact is increased some by mild stirring near the surface. The stirring of the column also encourages a significant back-flow of material in the column. Even though the movement of the column is downwardly on balance, enough of the mass passes upwardly in the column to keep the surface area of the mass at an average pH of approximately 4.5–5.5 preferably 4.5–5 and more preferably 4.6–4.8. It is believed that in the usual situation the rising ammonia vapor is a large factor in maintaining this relatively high pH at the surface of the mass. This pH is above 4.5. Reversion has been found to be much more pronounced at pH's below 4.5 when neutralization is carried out. It has also been found that if the general pH of a sizable region of the mass is allowed to drop below about 4.5 the mass has a tendency to set up. Therefore, the pH of the mass in the second reaction zone should be constantly monitored to assure that the pH is maintained above 4.5. It has been found in practice that the pH of the mass flowing from the reaction zone may be continuously monitored to provide a monitoring of the pH in the second reaction zone. If the mass is sufficiently large compared to the materials charged into the second reaction zone to provide for only gradual changes in the pH of the second reaction zone this method of checking the pH of the outflow from the zone is very effective. This procedure enables the pH to be easily monitored without taking samples from the reaction zone. In addition if the outflow, which is at about 235° F., is cooled before the pH is taken the pH meters are not subject to such vigorous conditions which reduces maintenance. The pH values previously discussed are all for temperatures of 235° F. At lower temperatures the same material will give a different pH reading but the pH value at various temperatures vary by a constant so that the fluctuations in the hot mass are parallel to the pH fluctuations in the cool product.

The fluid mass of the materials charged to the second reaction zone has a slow columnar movement downwardly due to the effect of gravity. After the mass has moved down through the mixing and reaction section of the neutralization reaction zone it moves laterally into an upwardly moving column that is moved upwardly by the push of the downwardly moving column. The second or upwardly moving column in the second reaction zone is a quiet, unagitated portion as it moves through the quiet section of the second reaction zone. There is little unabsorbed ammonia in the mass as it rises in this area because the ammonia was sparged in above the area where the lateral movement occurs and most of the ammonia that was not quickly absorbed was vaporized and moved upwardly in the first section of the neutralization reaction zone. This second column, however, serves not only as the counterbalance to the first column but also to assure that the ammonia that is still unabsorbed can be almost completely absorbed so that the product yielded by the second reaction will be relatively stable and homogeneous. Normally, an average dwell time of about 15 min. is required to achieve a desired neutralization of the acidulate to 4.5 to 5 when ammonia is introduced substantially as fast as it can be absorbed.

By maintaining the dwell time in the neutralization reaction zone short and providing cooling immediately after withdrawal from the neutralization reaction zone the reversion problem is substantially reduced particularly when sulfuric acid is used. The neutralization reaction maintains the mass above its boiling point which is about 235° F. It has been found that retention times as long as 1½ hours in the reaction zone at such high temperatures results in excess reversion as much as 20% compared to only about 5% when the mass is cooled to less than 130° preferably 100° F. within 30 minutes after entering the ammoniator. This 30 minutes includes the average residence time in the ammoniator. Reducing the temperature wnthin about 1 hour after ammoniation begins gives substantial benefits, particularly in the case of sulfuric acid containing formulations. The time span within which the temperature of the mass should be lowered is calculated from the average time for ammoniation, dwell time, and the additional time to move the mass to the cooler and lower its temperature below the desired level. A reversion of 5% as used in this application would be for example from 98% conversion of the phosphate rock on a $P_2O_5$ basis to 93% plant available phosphorus. A 20% reversion would be from 98% conversion to 78% available phosphorus on a $P_2O_5$ rock basis.

Temperature reduction not only prevents reversion, it also aids the attaining of good rheology. This effect of temperature is enhanced if the mass is cooled under agitation. Cooling while agitating is particularly helpful in encouraging the rapid formation of many small crystals rather than a lesser number of larger crystals. Of course, part of the reversion effect may be due to other factors such as additional exposure time to unreacted ammonia.

In both the first and second reaction zones visual monitoring is usually sufficient to prevent problems with the physical state from becoming severe. It is, however, necessary that the rates of addition be sufficiently low relative to the total mass to provide slow changes in the physical state. Under such circumstances small adjustments in the rates of addition made in response to visual observation will usually control the physical state of the reaction mass in both reaction zones once the process is on stream. Of course, automatic monitoring means offer advantages.

The mass is constantly removed from the top portion of the second column and subjected to rapid cooling. Then the material can be transferred to another facility or zone for further processing, to a storage area, to an applicator vehicle or to some other appropriate repository. Of course, other intermediate processes may be added to the one described. For example, potassium chloride may be added to the top of the first column in the neutralization reaction zone.

It is generally desirable to start the process with a preheated heel in the neutralization reaction zone because of the problems with "setting up" encountered in getting on stream when this zone is started up empty. The heat of reaction resulting from neutralization will usually maintain the temperature of the mass in the neutralization reaction zone at the boiling point, about 220° F. If no preheating is employed by careful manipulation and watching for thick stage trouble, start up can be had with the heat of reaction bringing the mass up to temperature. The process can even be started without a heel but the first material produced is generally unsatisfactory until the apparatus is on stream. The acidulation reaction zone can generally be started up from scratch without a heel.

When other agriculturally beneficial ingredients such as potassium chloride, trace element, herbicides, and insecticides are added to the mass, it is generally possible to add these ingredients to the top of the first column of the second reaction zone. The pH in this area is optimally maintained between about 5.0 and 6.5, and therefore, it is not so acid as to deleteriously affect most materials that would be added to the mass. Potassium chloride can, therefore, be added at this time without evolving a significant amount of HCl. If HCl were to be evolved in a significant amount it would cause a substantial corrosion problem. The other materials must, of course, neither affect the fertilizer slurry deleteriously or be deleteriously affected by the conditions of the mass when added. In many instances it may be wise to make the additions after the product has been cooled.

It may also be desirable in certain instances to add other materials such as materials to improve the suspension properties of the product and even inert ingredients at various stages of the process. Such additions are generally possible as long as they do not deleteriously affect the reactions that are taking place and so long as they are not deleteriously affected by the reaction taking place during the process. Of course, enough fluids must be maintained in the system to keep the mass fluid and the ingredients must be in a combination that will meet the desired fertilizer analysis.

"Attagel 150" suspension clay has been found to improve the suspension and rheological properties of the slurry fertilizer when added in quantities of 0.1 to 2.0% on an end product basis. The preferred addition rate for Attagel clay is 1% on an end product basis. The addition of potash causes a thinning of the slurry fertilizer of this invention and therefore the Attagel is somewhat more useful when potash is used.

Surprisingly, when the pH of the slurry fertilizer is finished off during process at 4.5 to 5 at a temperature of about 235° F. and the slurry is cooled the pH rises immediately to about 5.5. If the slurry fertilizer is finished at a pH of 5.5 and the slurry cooled as before the pH will remain 5.5. The pH remains stable at about 5.5 in both instances. If the pH of the product is raised to the 6 plus level during processing it has been found that the pH tends to drift down toward 5.5 over a period of time.

One of the advantages of the process of this invention is the freedom from noxious and harmful fumes during processing. The fluorine was found to be given off despite the presence of from about 3–4% fluorine in the phosphate rock. Only the slightest traces of nitrate nitrogen and phosphorus could be found in the steam emitted from the boiling mass in the second reaction zone. If it is desired to ammoniate at higher rates a significant degree of ammonia could be expected to pass through the first section of the second reaction zone unabsorbed. At the preferred pH of 4.5–5.0 which in most instances has been found best the ammonia loss is less than 3% at he rate set out in this application. This ammonia loss is marginal from the standpoint of justifying the installation of a scrubber. If a higher pH is to be attained or a higher ammoniation rate is adopted it may be desirable to put a hood over the second reaction chamber, collect the off gases and scrub out the ammonia.

The slurry product that may preferably be produced by the process of this invention has an analysis of about 12–24–0 and may be used as a base mix for producing complete fertilizers having an analysis of 7–14–7, 6–12–12, 6–12–18, 7–14–14 and 6–12–24. The slurry fertilizers exhibit a very high conversion of the phosphates in the phosphate rock usually about 95 to 98% conversion. This may in part be attributed to the high operating temperature in the acidulator above 140° F. The percent of the available phosphate that is water soluble is from 55 to 65% more often 60 to 65%. The slurry fertilizer has good rheology storage properties and suspension qualities. The slurry fertilizer is free flowing, readily pumpable and sprayable. Any solids that do settle are easily resuspended. The water content of the slurry fertilizer is from 17 to 23% more usually 19–21%; density is from 1.60 to 1.65, more usually 1.63 to 1.64. The slurry fertilizer thins with cooling but no thick stage problems are encountered during processing. As the temperature drops after processing, the pH will go up from about 4.5 to a pH of about 5.5 without any additional neutralizing agent being added. A stable pH exists between a pH of 5.5 and 5.7 and the slurry has a strong tendency to seek this pH range. Sometimes the slurry contains .5 to 2.0% Attagel clay and a sodium salt of sulfonated oleic acid content of 0.01 to 0.03% on an end product basis.

The invention is further described by but not limited to the following examples.

EXAMPLE 1

In practicing the process to produce a 10–20–0 slurry fertilizer, in a preferred manner, in the combination of apparatus shown diagrammatically in FIGURE 1, the following listed ingredients were charged into the mixing and reaction section 13 of the chamber 20. Water at 41.04 grams per minute, nitric acid (55–57%) at 57.50 grams per minute, black wet process phosphoric acid (75%) at 48.68 grams per minute and phosphate rock (75 BPL) at 46.49 grams per minute. The phosphoric acid and the phosphate rock were obtained from the Davison Division of W. R. Grace & Co. The phosphate rock was Florida rock obtained from the Davison Division of W. R. Grace & Co. and was 100% through 30 mesh U.S. Standard screen and 60–70% through 200 mesh U.S. Standard screen size.

When the material rose to the propeller 26 the agitator 25 was turned on. The material continued to fill the reactor 11 until it reached the outlet 23 in the second section 14 of the chamber 20. At this time the mass in reactor 11 began to follow the flow path 21 with a first columnar movement down in section 13 of the chamber 20 and then a lateral movement through opening 16 with a subsequent upwardly movement in a second column 10 to the outlet 23. The material soon built a full flow volume through outlet conduit 24 and began to flow at about 190 grams per minute to the second reactor 12.

Although a small amount of acidulation undoubtedly occurs after the mass has entered the second reactor 12, once the apparatus is on stream the acidulation that occurs in the second reactor is so slight as to be of little importance. Thus, the effective acidulation period would include the residence time of the mass in the reaction chamber 20 and the time required to flow to the reactor 12, a total of about 30 minutes. Because the reactors 11 and 12 were positioned within 6 inches of each other, for all practical purposes, the reaction zone can be considered to correspond to the reaction chamber 20 and the reaction time can be considered about 30 minutes.

A "heel" of 2500 grams of 8–16–0 slurry was placed in the reactor 12 before the acidulant began to flow from the outlet conduit 24 of the reactor 11. This initial "heel" material was heated to 220° F. prior to the first inflow of acidulant.

The 8–16–0 "heel" was prepared by a batch process in a 7½ liter glass reactor having a stainless steel top. Two chainless steel baffles were attached to the top and extended down to the mixing area. The reactor was equipped with an agitator that had a 4 inch turbine and a motor speed of 500–700 r.p.m. An ammonia sparger was mounted in the reactor under the agitator turbine. The ammonia sparger was fed from a source external of the reactor. 1062 grams of water was charged into the reactor and the agitator was turned on. The 1206 grams of black phosphoric acid (52%) was charged into the reactor. Next, 1449 grams of nitric acid (56%) was charged into the reactor after which 1155 grams of 75 BPL phosphate rock was fed into the reactor over a period of about 5 minutes. About 8 grams of 1:3 sodium salt of a sulfonated oleic acid water mixture was added as needed to control foaming. Acidulation was allowed to continue for about 10 minutes after the completion of the rock addition and then ammonia addition was begun via the sparger at 3.0 grams of ammonia/minute/2000 grams product until about 99 grams of ammonia was added. Then the ammonia addition rate was reduced to 2.0 grams of ammonia/minute/2000 grams of product until 71 additional grams of ammonia was added. The ammonia addition rate was then increased to 3.0 grams of ammonia/minute/2000 grams of product until 180 additional grams of ammonia was added and then 798 grams of water was added after which 39 additional grams of ammonia was added at 2.0 grams of ammonia/minute/2000 grams of product. The pH was approximately 7.0.

After the "heel" was placed in the reactor and immediately before the acidulant began to flow from the reactor 11 into reactor 12, the addition of water to reactor 12 was begun at 5 grams per minute, and the addition of anhydrous ammonia (82%) was begun at about 19 grams per minute through sparger 76. This rate of ammonia addition was maintained for the entire period of the run which was 5½ hours. The loss of ammonia vapor during the run was about 10–20% of the ammonia added.

Within about 10 minutes the mass reached the outlet 61 in reactor 12 and began to flow from the outlet into the cooler-crystallizer 80. The mass flowed into the cooler crystallizer at a temperature of about 192° F. and out through conduit 83 at a temperature of about 104° F. after a residence time of about 18 minutes. The water flowed through the coil 82 at about 345 grams per minute, entering at a temperature of about 76° F. and discharging at a temperature of about 95° F. The mass flowed from the cooler crystallizer 80 through a pH meter 84 and through discharge conduit 85 into a 13 gallon polyethylene storage bottle. The mass followed the flow path 55 in reactor 12 with a first columnar movement down in section 51 of the chamber 54, a lateral movement through opening 60, and subsequent upward movement in a second column to the outlet 61. The average residence time in the reaction chamber 54 of the second reactor 12 was approximately 18 minutes. The yield was approximately 200 grams per minute. A sample was taken from the storage bottle at the end of the run and analyzed. Its analysis was total nitrogen 10.50% total phosphorus as $P_2O_5$ 20.90%, available phosphoric anhydride 19.82%, citrate insoluble phosphorus as $P_2O_5$ 1.08% and a pH of 5.3. The percent of the phosphorus that was available was 86.5% on a rock basis and 94.8% on a total phosphorus basis.

The mass in reactor 11 and in reactor 12 remained very fluid continuously. The pH of the stream flowing from outlet 61 was checked about every hour and ranged between 5.1 and 5.4.

EXAMPLE 2

The equipment and procedure of Example 1 was used except as follows. An 11-22-0 slurry was produced. The water was added to chamber 20 at 21.0 grams per minute, the nitric acid was added at 50.88 grams per minute, a premix of 40.24 grams of black phosphoric acid to 6.00 grams of sulfuric acid (93.0%) was added at 47.27 grams per minute, and phosphate rock was added at 49.05 grams per minute. When the material reached the outlet conduit 24 and built its full flow volume, the flow rate was about 166 grams per minute. The average residence time in reaction chamber 20 was about 33 minutes.

A "heel" of 2500 grams of 8-16-0 slurry was placed in the reactor 12 before acidulation was begun and the "heel" was heated as before. The heel was prepared using the same equipment as in preparing the heel of Example 1. The procedure of preparing the heel differed in the following respects. 1422 grams of water was initially charged to the reactor and then the agitator was turned on. Next 1083 grams of black phosphoric acid was charged to the reactor and after this 189 grams of 93% sulfuric acid was added. Then 1320 grams of 75 BPL phosphate rock was charged to the reactor over about 5 minutes. About 8 grams of a 1:3 sodium salt of sulfonated oleic acid water mixture was added as needed to control foaming. Acidulation was allowed to continue for about 10 minutes after the completion of the rock addition and then ammonia addition was begun at 2.7 grams of ammonia/minute/2000 grams of product until about 123 grams of ammonia was added. Then the ammonia addition rate was reduced to 2.0 grams of ammonia/minute/2000 grams of product until about 60 additional grams of ammonia had been added. Next 408 grams of water was added and the ammonia addition rate was increased to 2.7 grams of ammonia/minute/2000 grams of product until an additional 147 grams of ammonia was added. After this the ammonia addition rate was reduced to 1.4 grams of ammonia/minute/2000 grams of product until an additional 42 grams of ammonia was added. Then ammonia was added at 1.4 grams of ammonia/minute/2000 grams of product until the pH reached 6.5 which was about 10 more minutes.

When the acidulate first began to flow from the reactor 11 to the reactor 12, ammoniation was begun at about 17 grams per minute and continued at this rate for the entire period of the run, about 3 hours. The loss of ammonia vapor during the run was about 12-15% of the ammonia added.

The average residence time in the reaction chamber 54 of the second reactor 12 was approximately 23 minutes and the yield was approximately 158.8 grams per minute. The product was analyzed as in Example 1 and had a total nitrogen content of 12.14%, a total phosphorus content as $P_2O_5$ of 23.35%, an available phosphoric anhydride content as $P_2O_5$ of 22.59%, a citrate insoluble content of 0.75% and a pH of 5.3. The percent of the phosphorus that was available was 92.7% on a rock basis and 96.7% on a total phosphorus basis.

The mass is reactor 11 and in reactor 12 remained very fluid continuously. The pH of the stream flowing from outlet 61 was checked about every hour and ranged between 5.8 and 6.3.

EXAMPLE 3

In practicing the process to produce 12-24-0 slurry fertilizer, in a preferred manner, in the combination of apparatus shown diagrammatically in FIGURE 1, the following listed ingredients were charged into the mixing and reaction section 13 of the chamber 20. Water at 54.60 grams per minute, nitric acid (55-57%) at 143.64 grams per minute, black wet process phosphoric acid (75%) at 138.81 grams per minute and phosphate rock (75 BPL) 110.10 grams per minute. The phosphoric acid and the phosphate rock were the same as in Example 1.

When the material rose to the propeller 26 the agitator 25 was turned on. The material continued to fill the reactor 11 until it reached the outlet 23 in the second section 14 of the chamber 20. At this time the mass in reactor 11 began to follow the flow path 21 with a first columnar movement down in section 13 of the chamber 20 and then a lateral movement through opening 16 with a subsequent upwardly movement in a second column 10 to the outlet 23. The material soon built a full flow volume through outlet conduit 24 and began to flow at about 440 grams per minute to the second reactor 12.

Although a small amount of acidulation undoubtedly occurs after the mass has entered the second reactor 12, once the apparatus is on stream the acidulation that occurs in the second reactor is so slight as to be of little importance. Thus, the effective acidulation period would include the residence time of the mass in the reaction chamber 20 and the time required to flow to the reactor 12, total of about 60-75 minutes. Because the reactors 11 and 12 were positioned within 6 inches of each other, for all practical purposes, the reaction zone can be considered to correspond to the reaction chamber 20 and the reaction time can be considered about 60-75 minutes.

A "heel" of 5000 grams of 8-16-0 slurry was placed in the reactor 12 before the acidulant began to flow from the outlet conduit 24 of the reactor 11. This initial "heel" material was heated to about 220° F. prior to the first inflow of acidulant.

The 8-16-0 "heel" was prepared by a batch process in a 7½ liter glass reactor having a stainless steel top. Two stainless steel baffles were attached to the top and extended down to the mixing area. The reactor was equipped with an agitator that had a 4 inch turbine and a motor speed of 500-700 r.p.m. An ammonia sparger was mounted in the reactor under the agitator's turbine. The ammonia sparger was fed from a source external of the reactor. 1526 grams of water was charged into the reactor and the agitator was turned on. The 1809 grams of black phosphoric acid (52%) was charged into the reactor. Next, 2174 grams of nitric acid (56%) was charged into the reactor after which 1728 grams of 75 BPL phosphate rock was fed into the reactor over a period of about 5 minutes. About 8 grams of 1:3 sodium salt of a sulfonated oleic acid water mixture was added as needed to control foaming. Acidulation was allowed to continue about 10 minutes after the completion of the rock addition and then addition was begun via the sparger at 3:0 grams of ammonia/minute/2000 grams of product until about 175 grams of ammonia was added. Then the ammonia addition rate was reduced to 2.0 grams of ammonia/minute/2000 grams of product until 85 additional grams of ammonia was added. 1165 grams of water was then added. The ammonia addition rate was then increased to 3.0 grams of ammonia/minute/2000 grams of product until 275 additional grams of ammonia was added. 82 additional grams of ammonia was added at about 1.3 grams of ammonia/minute/2000 grams of product. The pH was approximately 6.0. 256 grams of water was added to a final weight of 9000 grams of which 5000 grams was used as the "heel" for starting up the continuous process. Analysis of the above "heel" was 8.52% TN, 18.85% TPA, 16.41% APA, 0.44% Cl.

After the "heel", at a temperature of about 200° F.–220° F., was placed in the reactor and immediately before the acidulant began to flow from the reactor 11 into reactor 12, the addition of anhydrous ammonia (82%) was begun at about 45 grams per minute through sparger 76. This rate of ammonia addition was maintained for the entire period of the run which was 14 hours. The loss of ammonia vapor during the run was about 3-5% of the ammonia added. Since the "heel" analyzed only 8-16-0 a period of time was required for the product analysis to approach the desired 12-24-0 level.

Within about 10 minutes the mass reached the outlet 61 in reactor 12 and began to flow from the outlet into a 13 gallon polyethylene storage bottle. The mass followed the flow path 55 in reactor 12 with a first columnar movement down in section 51 of the chamber 54, a lateral movement through opening 60, and subsequent upward movement in a second column to the outlet 61. The average residence time in the reaction chamber 54 of the second reactor 12 was approximately 15–20 minutes. The yield was approximately 435 grams per minute. A sample was taken from the storage bottle at then end of the run and analyzed. Its analysis was total nitrogen 12.41%, total phosphorus as $P_2O_5$ 25.76%, available phosphoric anhydride 24.86% citrate insoluble phosphorus as $P_2O_5$ 0.90% and a pH of 5.6. The percent of the phosphorus that was available was 90.3% on a rock basis and 96.5% on a total phosphorus basis.

The mass in reactor 11 and in reactor 12 remained very fluid continuously. The pH of the steam flowing from outlet 61 was checked about every hour and ranged between 4.6 and 5.0. pH of the slurry after cooling prior to storage was 5.5.

EXAMPLE 4

In practicing the process to produce a 12–24–0 slurry fertilizer, in a preferred manner, in the combination of apparatus shown diagrammatically in FIGURE 1, the following listed ingredients were charged into the mixing and reaction section 13 of the chamber 20. Water at 54.6 grams per minute, nitric acid (55–57%) at 143.6 grams per minute, black wet process phosphoric acid (52) at 133.8 grams per minute and phosphate rock (75 BPL) at 110.1 grams per minute. The phosphoric acid and the phosphate rock were the same as in Example 1.

When the material rose to the propeller 26 the agitator 25 was turned on. The material continued to fill the reactor 11 until it reached the outlet 23 in the second section 14 of the chamber 20. At this time the mass reactor 11 began to follow the flow path 21 with a first columnar movement down in section 13 of the chamber 20 and then a lateral movement through opening 16 with a subsequent upwardly movement in a second column 10 to the outlet 23. The material soon built a full flow volume through outlet conduit 24 and began to flow at about 440 grams per minute to the second reactor 12.

Although a small amount of acidulation undoubtedly occurs after the mass has entered the second reactor 12, once the apparatus is on stream the acidulation that occurs in the second reactor is so slight as to be of little importance. Thus, the effective acidulation period would include the residence time of the mass in the reaction chamber 20 and the time required to flow to the reactor 12, a total of about 60–70 minutes. Because the reactors 11 and 12 were positioned within 6 inches of each other, for all practical purposes the reaction zone can be considered to correspond to the reaction chamber 20 and the reaction time can be considered about 60–75 minutes.

A "heel" of 5000 grams of 12–24–0 slurry such as that prepared in Example 3 was placed in the reactor 12 before the acidulant began to flow from the outlet conduit 24 of the reactor 11. This initial "heel" material was heated to about 220° F. prior to the first inflow of acidulant.

After the "heel" was placed in the reactor and immediately before the acidulant began to flow from the reactor 11 into reactor 12, the addition of anhydrous ammonia (82%) was begun at about 45 grams per minute through sparger 76. This rate ammonia addition was maintained for the entire period of the run which was 13 hours. The loss of ammonia vapor during the run was about 3% of the ammonia added.

Within about 1–2 minutes the mass reached the outlet 61 in reactor 12 and begun to flow from the outlet into the cooler crystallizer 80. The mass followed the flow path 55 in reactor 12 with a first columnar movement down in section 51 of the chamber 54, a lateral movement through opening 60, and subsequent upward movement in a second column to the outlet 61. The average residence time in the reaction chamber 54 of the second reactor 12 was approximately 13 minutes. The yield was approximately 435 grams per minute or about 57 pounds per ton.

The cooler-crystallizer 80 was maintained at 100° F. The pH meter 84 was placed on the cold side of the cooler-crystallizer for a portion of the time and the pH was held at 5.6–5.7. The pH meter 84 was moved to the hot side of the cooler-crystallizer for a portion of the time and the pH was maintained at 4.6–4.8. The pH rose to 4.6–5.7 upon cooling to 75° F. Hot monitoring of the pH is the most accurate but cold monitoring is less severe on the pH measuring instrument.

The mass flowed from discharge conduit 85 into a 13 gallon polyethylene storage bottle as in Example 1. A sample was taken from the storage bottle at the end of the run and analyzed. Its analysis was total nitrogen 12.26%, total phosphorus as $P_2O_5$ 25.52%, available phosphoric anhydride 24.82% moisture of about 18.0% citrate insoluble phosphorus as $P_2O_5$ 0.70%, water soluble $P_2O_5$ 14.2% and a pH of 5.7. The percent of the phosphorus that was available was 92.2% on a rock basis and 97.3% on a total phosphorous basis.

The mass in reactor 11 and in reactor 12 remained very fluid continuously. The pH of the stream flowing from outlet 61 was checked continuously and maintained at 4.6–5.7. The pH of the product was found to remain constant at 5.7. Samples of 12–24–0 slurry showed stable pH's at 5.7 after 3 months of storage.

EXAMPLE 5

The apparatus and procedure of Example 4 were used except the 12–24–0 "heel" was at a temperature of about 75° F. and the heat of reaction as the process went on stream was used to heat the mass up to running temperature. This method, although more difficult than when a hot heel is employed, can be used. As the acidulate and ammonia mixed with the heel, the temperature gradually rose due to the heat of reaction of the ammonia and acidulate until the boiling point is obtained. Analysis of a 5 hour run was: 12.35% TN; 25.55% TPA; 0.78% CI, 24.77% APA; 14.65% water soluble $P_2O_5$; 20.759% water and a pH of 5.5. The production rate was about ⅓ that shown in Example 4. Raw material rates were 15.12 grams of ammonia per minute. 48.02 grams of nitric acid per minute, 46.42 grams of phosphoric acid per minute, 36.94 grams of phosphate rock per minute and 18.20 grams of water per minute. The average product yield rate was 145.0 grams per minute.

EXAMPLE 6

1167 grams of slurry fertilizer of the type produced in Example 4, except made at only ⅓ of the production rate of Example 4, was placed in a container and 381 grams of water and 452 grams of 62% potassium chloride were cold blended into it. The analysis of the original slurry fertilizer was 12.10% N; 25.06% water soluble $P_2O_5$; 21.39% moisture of water; and the pH was 5.5. After the addition of the KCl and water the analysis was 7.00 N; 14.56 TPA; 0.34 CI; 14.22 APA; 7.16 water soluble $P_2O_5$; 31.90% water; 13.89% $K_2O$ and and pH was 5.3.

EXAMPLE 7

10 grams of "Attagel" was cold blended into 900 grams of slurry fertilizer of the 12–24–0 type of Example 6.

The suspension properties of the slurry fertilizer were observed to be significantly improved.

While in accordance with the patent statutes the foregoing specification describes the invention in considerable detail with a number of specific embodiments having been referred to for purposes of illustration, it will be apparent to those skilled in the art that the invention is susceptible to additional embodiments and that many of the details described can be varied considerably without departing from the essence and scope of the invention.

What is claimed is:

1. A continuous fluid process for producing fertilizer by reacting phosphate rock with an acid and neutralizing the acidulate comprising the steps of continuously charging phosphate rock and an acid into a digestion reaction zone, said acid being selected from the group consisting of nitric, sulfuric, and phosphoric and mixtures thereof, said acid being continuously charged to an area of the surface of a columnar mass in the digestion reaction zone, said phosphate rock continuously charged to a different area of the surface of said columnar mass, said columnar mass including said acid and said phosphate rock, and moved downwardly on balance by the action of gravity and the addition of the materials to the surface of the column, the upper portion of the column being mildly stirred and the lower portion of the column vigorously stirred providing a significant back flow in said column so that the chemical changes in said column are progressive but moderate in any given unit of the mass, said mass being continuously transferred from the bottom of the downwardly moving column laterally to a column moving on balance upwardly, said upwardly moving column being maintained relatively quiescent so that the column will be relatively homogeneous in its upper portion; continuously transferring the mass from the upper portion of the upwardly moving column to a neutralization reaction zone comprising a second column moving on balance downwardly, continuously charging anhydrous ammonia into a lower portion of said second downwardly moving column, the second downwardly moving column being vigorously stirred in said lower portion of the region where the anhydrous ammonia is charged into the downwardly moving column to thoroughly disperse said ammonia laterally, while the portion of said second downwardly moving column above said lower portion is mildly stirred to bring the anhydrous ammonia that vaporizes and rises in the column into intimate contact with the mass while providing ammonia vapor retention qualities to provide a significant back flow in said column so that the chemical changes and resulting pH in said column are progressive but moderate in any given unit of the mass and so that the area of the column into which the mass from the upper portion of the first upwardly moving column is transferred is relatively neutral; continuously transferring said mass from the bottom of the second downwardly moving column laterally to a second column moving upwardly on balance while maintaining said second upwardly moving column relatively quiescent so that the column will be homogeneous in its upper portion; maintaining the pH in said neutralization zone comprising said second downwardly moving column in the range of from 4.5–6.5, removing said mass from the upper portion of the second upwardly moving column, and cooling said mass below 130° F. after removal thereof.

2. The process of claim 1 wherein the average dwell time in said digestion reaction zone is 30 min. and wherein the average dwell time in said neutralization reaction zone is about 15 min., and wherein said mass is cooled below 130° F. within 1 hour after removal thereof.

3. An apparatus for continuously producing fertilizer materials comprising a first circuitous chamber, said chamber including a first section and a second section, said first section and said second section separated by a dividing wall, said first section being connected to said second section by a passageway through said dividing wall, said passageway positioned in the lower portion of said dividing wall; an agitator positioned in said first section of said circuitous chamber and in the intermediate zone thereof; first and second conduit means adapted for feeding an acid and phosphate rock, respectively, into said first section of said circuitous chamber, said first acid feed conduit means and second phosphate rock feed conduit means being positioned to open into the said first section of said circuitous chamber above the normal fluid level of said chamber; an outlet from the second section of said first circuitous chamber, said outlet comprising an overflow spaced above the bottom of the second section of said circuitous chamber and at a distance sufficient to provide an average dwell time of at least 30 min. when the apparatus is operated at its highest intended rate; a second circuitous chamber, said second circuitous chamber including a first section and a second section, said first section and second section of said second circuitous chamber being separated by a dividing wall, said first section being connected to said second section by a passageway through said dividing wall; a flow connection between the outlet from said first circuitous chamber and said second circuitous chamber, said flow connection comprising conduit means, said means being adapted for discharging above the normal fluid level of said second chamber; an agitator positioned in said first section of said second circuitous chamber below the normal fluid level of said second chamber and in an intermediate zone thereof; an ammonia sparger positioned in second first section of said second circuitous chamber below said agitator; an outlet from said second section of said second circuitous chamber, said outlet comprising an overflow spaced above the bottom of said second section of said second circuitous chamber at a sufficient distance to provide an average dwell time of at least 15 min. when the apparatus is operated at its highest intended rate, and cooling means positioned downstream and in fluid flow communication with said outlet of said second circuitous chamber.

4. Apparatus according to claim 3 and further comprising third and fourth conduit means for dispensing into said first section of said first circuitous chamber, a defoamer and water, respectively, said third and fourth conduit means being positioned above the normal fluid level of said first section; and conduit means for dispensing potassium into the first section of said second circuitous chamber, said conduit means for dispensing potassium being positioned above the normal fluid level of said first section of said second circuitous chamber.

5. A continuous fluid process for producing fertilizer by reacting phosphate rock with an acid and neutralizing the acidulate, said process comprising the steps of continuously charging an acid and phosphate rock into a digestion reaction zone, said acid selected from the group consisting of nitric, sulfuric, and phosphoric acids and mixtures thereof; maintaining the fluid content of the mass at a level that will keep the mass continuously fluid, thoroughly mixing said acid and said phosphate rock in a first section of said digestion reaction zone to bring the acid into good contact with the surfaces of the phosphate rock, continuously withdrawing the mass from said digestion reaction zone through a quiet section, continuously transferring the acidulated mass to a neutralization reaction zone, continuously agitating said mass in a first section of the neutralization zone and in an intermediate zone thereof; continuously charging ammonia into the first section of the neutralization zone and, at a point below agitation of said mass in said neutralization zone, maintaining said pH in said first section of said neutralization zone in the range of from 4.5–6.5, continuously removing said mass from the first section of said neutralization reaction zone through a quiet section of the neutralization reaction zone, thereby providing a sufficient period of time between the beginning of the mixing of the acid with phosphate rock and an effective neutralization of the acidulate by the neutralizing material to provide for a substantial digestion of the phosphate rock, and cooling said mass below 130° F. after removal thereof.

(References on following page)

References Cited

UNITED STATES PATENTS

| | | | |
|---|---|---|---|
| 1,849,703 | 3/1932 | Boller | 23—259.2 X |
| 2,680,680 | 6/1954 | Coleman | 71—41 X |
| 2,701,193 | 2/1955 | Heudier et al. | 71—39 X |
| 2,845,936 | 8/1958 | Boynton et al. | 23—285 X |

FOREIGN PATENTS

| | | |
|---|---|---|
| 690,704 | 7/1964 | Canada. |

OTHER REFERENCES

Waggaman, Wm. H.: Phosphoric Acid, Phosphates and Phosphatic Fertilizers, Reinhold, N.Y. (1960), pp. 331, 341. TP24S P5W3.

DONALL H. SYLVESTER, *Primary Examiner.*

R. D. BAJEFSKY, *Assistant Examiner.*